United States Patent
Inagaki et al.

(10) Patent No.: US 10,608,748 B2
(45) Date of Patent: Mar. 31, 2020

(54) COMMON MODE REJECTION RATIO MEASUREMENT DEVICE FOR COHERENT OPTICAL RECEIVER, AND MEASUREMENT METHOD

(71) Applicant: NATIONAL INSTITUTE OF INFORMATION AND COMMUNICATIONS TECHNOLOGY, Koganei-shi, Tokyo (JP)

(72) Inventors: Keizo Inagaki, Koganei (JP); Tetsuya Kawanishi, Koganei (JP); Atsushi Kanno, Koganei (JP); Naokatsu Yamamoto, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 16/080,661

(22) PCT Filed: Feb. 23, 2017

(86) PCT No.: PCT/JP2017/006926
§ 371 (c)(1),
(2) Date: Aug. 28, 2018

(87) PCT Pub. No.: WO2017/150347
PCT Pub. Date: Sep. 8, 2017

(65) Prior Publication Data
US 2019/0097734 A1 Mar. 28, 2019

(30) Foreign Application Priority Data
Feb. 29, 2016 (JP) .................. 2016-038152

(51) Int. Cl.
*H04B 10/61* (2013.01)
*G01M 11/02* (2006.01)
*H04B 10/073* (2013.01)

(52) U.S. Cl.
CPC ......... *H04B 10/6151* (2013.01); *G01M 11/02* (2013.01); *H04B 10/0731* (2013.01);
(Continued)

(58) Field of Classification Search
CPC . H04B 10/614; H04B 10/616; H04B 10/6151
See application file for complete search history.

(56) References Cited

U.S. PATENT DOCUMENTS

2013/0294784 A1* 11/2013 Suzuki .............. H03F 3/08
398/208
2014/0341564 A1* 11/2014 Westlund ............ H04B 10/614
398/16

(Continued)

FOREIGN PATENT DOCUMENTS

| JP | 2012-37493 A | 2/2012 |
| JP | WO2013057967 A1 | 4/2013 |
| JP | 2015-37276 A | 2/2015 |

OTHER PUBLICATIONS

International Search Report of International Patent Application No. PCT/JP2017/006926 completed Apr. 24, 2017 and dated May 9, 2017 (5 pages).

(Continued)

*Primary Examiner* — Dzung D Tran
(74) *Attorney, Agent, or Firm* — Pyprus Pte Ltd (57) ABSTRACT

To provide a method and device capable of easily measuring the CMRR vs. frequency characteristics of an optical receiver. Light having a measurement frequency (ω [hz]) is split into two different paths, and a first optical two-tone signal, which is signal light and has a frequency difference (ω−Δω [hz]), and a second optical two-tone signal, which is (Continued)

local light and has a frequency difference ($\omega+\Delta\omega$ [hz]), are obtained and input into a coherent receiver to be measured, wherein electrical signals output from the receiver are measured to obtain both the ratio of the intensity of a signal component having the frequency $\omega-\Delta\omega$ [hz] to the intensity of a signal component having the frequency $\omega$ [hz], which corresponds to the CMRR on the signal light side, and the ratio of the intensity of a signal component having the frequency $\omega+\Delta\omega$ [hz] to the intensity of the signal component having the frequency $\omega$ [hz], which corresponds to the CMRR on the local light side.

4 Claims, 5 Drawing Sheets

(52) U.S. Cl.
CPC ......... *H04B 10/614* (2013.01); *H04B 10/615* (2013.01); *H04B 10/616* (2013.01)

(56) References Cited

U.S. PATENT DOCUMENTS

| | | | | |
|---|---|---|---|---|
| 2015/0295660 | A1* | 10/2015 | Suzuki | H03F 3/08 398/208 |
| 2016/0146869 | A1* | 5/2016 | Marsland, Jr. | H04B 10/0731 324/76.77 |

OTHER PUBLICATIONS

Written Opinion of International Patent Application No. PCT/JP2017/006926 completed Apr. 24, 2017 and dated May 9, 2017 (6 pages).
John E. Johnson et al, "Implementation Agreement for Integrated Dual Polarization Intradyne Coherent Receivers", Nov. 14, 2013.
Kawakami Ikuo, "Leave it all to Agilent! Coherent measurement. Complete commentary", Jul. 2013.

\* cited by examiner

COMMON MODE REJECTION RATIO MEASUREMENT DEVICE FOR COHERENT OPTICAL RECEIVER, AND MEASUREMENT METHOD

TECHNICAL FIELD

The present invention relates to a common mode rejection ratio measurement device and method for a coherent optical receiver that employs optical two-tone light.

BACKGROUND ART

In recent years, development of components for optical communication has progressed according to the OIF (Optical Internet Working Forum) industrial group standard. The CMRR defined in the newest "Polarization Multiplexed Integrated Coherent Receiver Standard for 100 Gbps" by OIF (Non-Patent Document 1 described below) measures the output for each PD before connecting a balanced PD and specifies calculation by a prescribed formula.

While, in the coherent measurement technology forum, Keysight (formerly Agilent) Co. recognizes the need for CMRR versus frequency characteristic measurement, as yet it has not been possible to provide any specific measurement solution (refer to Non-Patent Document 2 described below).

International Publication WO2013-057967 (Patent Document 1 described below) is not related to measurement technique, but relates to automatic adjustment of the gain of a differential type transimpedance amp (TIA) at the stage after a balanced PD, and to an optical receiver whose CMRR is excellent.

CITATION LIST

Patent Literature

Patent Document 1: International Publication WO2013-057967.
Patent Document 2: Japanese Laid-Open Patent Publication 2012-37493.

Non-Patent Literature

Non-Patent Document 1:
Optical Internet Working Forum, "Implementation Agreement for Integrated Dual Polarization Intradyne Coherent Receivers", IA OIF-DPC-RX-01.2, November 2013.
Non-Patent Document 2:
Kawakami Ikuo, "Leave it all to Agilent! Coherent measurement Complete commentary", Agilent Measurement Forum 2013, 1D6, July 2013.

SUMMARY OF INVENTION

Technical Problem

In OIF's newest polarization multiplexed integrated coherent receiver standard for 100 Gbps, a connection is established to a differential transimpedance amp (TIA) at the stage after a balanced PD, after having measured the output of each PD. Due to this there has been a problem of discrepancy in the measured values, since the CMRR of the signal that is outputted from the TIA experiences some influence due to error in the connection unit and the characteristics of the differential TIA.

The optical receiver described in International Publication WO2013-057967 is one that automatically adjust the gain of the differential TIA and keeps the CMRR high, but, since it only adjusts the amplitude of the differential TIA, accordingly there is the problem that it is not possible to adjust the delay time difference.

Accordingly, an object of the present invention is to provide a method and a device according to which it is possible to measure the CMRR versus frequency characteristic of an optical receiver in a simple manner.

Moreover, another object of the present invention is to provide a method and a device that are capable of adjusting the amplitude and the delay time period in a coherent optical receiver that is the subject of measurement, and, by doing this, to provide an optical receiver that has a satisfactory CMRR specification over a wide band.

Solution to Technical Problem

Fundamentally, the present invention is based upon the following findings.

If light having a measurement frequency ($\omega$ [Hz]) is branched, a first optical two-tone signal having a frequency difference ($\omega-\Delta\omega$ [Hz]) which is signal light and a second optical two-tone signal having a frequency difference ($\omega+\Delta\omega$ [Hz]) which is locally generated light are obtained, these are inputted to the coherent receiver that is the subject for measurement, and the electrical signal outputted from this receiver is measured, then the signal intensity ratio of the component of frequency ($\omega-\Delta\omega$ [Hz]) with respect to the component of frequency ($\omega$ [Hz]) gives the signal light side CMRR. Moreover, the signal intensity ratio of the component of frequency $\omega+\Delta\omega$ [Hz] with respect to the component of frequency $\omega$ [Hz] gives the local light side CMRR. The CMRR characteristics of the receiver will become known by repeatedly measuring the signal light side CMRR or the local light side CMRR while changing the measurement frequency ($\omega$ [Hz]).

Advantageous Effects of Invention

The present invention is capable of providing a method and a device that are capable of measuring the CMRR versus frequency characteristic of an optical receiver in a simple manner.

Furthermore, the present invention is capable of providing a method and a device that are capable of adjusting the amplitude and the delay time period in a coherent optical receiver that is the subject of measurement, and, by doing this, to provide an optical receiver that has a satisfactory CMRR specification over a wide band.

DESCRIPTION OF EMBODIMENTS

In the following, embodiments of the present invention will be explained with reference to the drawings. However, the present invention should not be considered as limited by the following explanation; it also includes appropriate variations and corrections, within a range that would be evident to a person skilled in the art from the aspects described below.

Figure 1:
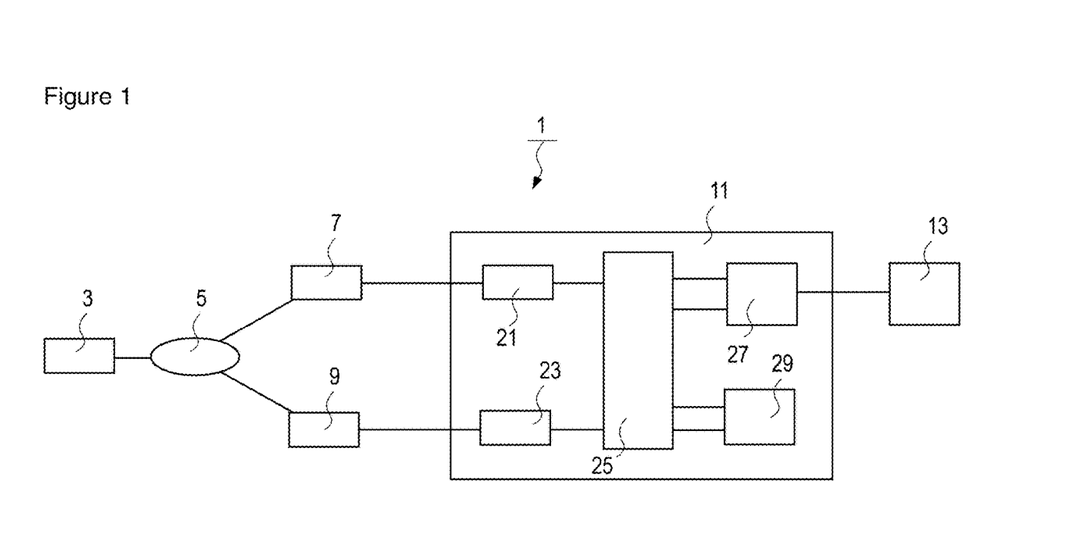
FIG. 1 is a block diagram showing a common mode rejection ratio measurement device of a coherent optical receiver according to the present invention.

FIG. 1 is a block diagram showing a common mode rejection ratio measurement device of a coherent optical receiver according to the present invention. The first embodiment of the present invention relates to a common mode rejection ratio measurement device of a coherent optical receiver. Common mode rejection ratio (CMRR), which is also sometimes termed in-phase signal rejection ratio, is a measure of the tendency, in a differential amplifier circuit or the like, to eliminate input signals that are common to two inputs.

A coherent optical receiver is an optical receiver that is also sometimes termed a "coherent receiver" or a "coherent light reception module" ("Research Report on coherent light communication systems, etc.", issued by the Mechanical Social Systems Foundation of Japan). Such a coherent optical receiver is a per se known optical receiver, as described in International Publication WO2012-086831 A1.

A coherent optical receiver may, for example, be one having a structure as follows. This optical receiver has a signal light input unit 21 to which signal light is inputted, a local light input unit 23 to which local light is inputted, a 90°, optical hybrid 25, and balanced PDs (photodetectors) 27 and 29. And the signal light that has been received and the local light are both branched by a branch part. The branched signal light and the branched local light are multiplexed by a multiplexing part such as a coupler or the like, and, on the I channel side, optical signals are synthesized by these two-tone light beams being combined in the same phase and in opposite phase. On the other hand, the phase of the remaining branched local light is converted by 90°, and this light is guided together with the remaining branched signal light and results in Q channel side two-tone light. And this two-tone light is detected by a balanced PD (photodetector).

The common mode rejection ratio measurement device 1 for a coherent optical receiver at the measurement frequency ($\omega$ [Hz]) is a device that measures the common mode rejection ratio of the optical receiver at any desired wavelength $\omega$. $\omega$ [Hz] is usually greater than or equal to 1 MHz and less than or equal to 500 GHz; but it would also be acceptable for it to be greater than or equal to 10 MHz and less than or equal to 100 GHz. Light of the measurement frequency ($\omega$ [Hz]) is preferably emitted from a laser light source, and preferably is continuous light (CW light). Moreover, it is desirable for the laser light source to be one whose wavelength can be swept or changed.

This device comprises a branch part 5 that branches off light from a laser light source 3 having a measurement frequency ($\omega$ [Hz]), a first optical two-tone generator 7, a second optical two-tone generator 9, and an electrical signal measurement device 13 that measures and analyzes an output electrical signal outputted from a coherent optical receiver 11.

A per se known branching device may be used as the branch part, provided that it can branch input light. Couplers that split the intensity of inputted light, beam splitters (BS), and Polarizing beam splitters (PBSs) are examples of branching devices.

The first optical two-tone generator 7 is a device that receives the first branched light branched off by the branch part 5, and generates a first optical two-tone signal which is signal light. This first optical two-tone signal has a frequency difference ($\omega-\Delta\omega$ [Hz]) that is lower than the measurement frequency. Normally, the frequency difference is obtained by subtracting the frequency of the lower side band (LSB) signal from the frequency of the upper sideband (USB) signal.

To the extent that the characteristics should not greatly change with respect to the measurement frequency $\omega$, it is desirable for $\Delta\omega$ to be selected to be small; and, to the extent that the measurement time interval does not occupy too much time, it is desirable for $\Delta\omega$ to be selected to be large. For example, $\Delta\omega$ may be greater than or equal to one millionth of $\omega$ and less than or equal to one thousandth of $\omega$, and may desirably be greater than or equal to one hundred thousandth of $\omega$ and less than or equal to one ten thousandth of $\omega$. For example, when w is 1 GHz or more, it is desirable for $\Delta\omega$ to be greater than or equal to 100 kHz and less than or equal to 1 MHz.

Per se known optical two-tone generators may be used as the optical two-tone generators 7 and 9, provided that they are capable of generating two optical signals that are shifted by a predetermined frequency from a standard frequency. For example, such an optical two-tone generator may employ a DSB (double sideband) modulator, or may employ a DSB-SC modulator. It is desirable for the two optical two-tone light signals to have approximately the same intensity.

The second optical two-tone generator 9 is a device that receives the second branched light branched off by the branch part 5, and generates a second optical two-tone signal which is locally generated light. This second optical two-tone signal has a frequency difference ($\omega+\Delta\omega$ [Hz]) that is higher than the measurement frequency. It is desirable for the optical intensities of the first optical two-tone signal and the second optical two-tone signal to be approximately the same. In particular, it is desirable for the intensities of the two optical signals that constitute the first optical two-tone signal and the two optical signals that constitute the second optical two-tone signal all to be approximately the same.

The electrical signal measuring device 13 is a device that receives the output electrical signal outputted from the coherent optical receiver 11 that is the subject for measurement of common mode rejection ratio (CMRR), and that, for example, measures its optical intensity and analyzes the CMRR by using that information. The example of the electrical signal measurement device 13 is a per se known spectrum analyzer, but it is desirable to employ an electrical signal measurement device that is used for coherent light communication.

The electrical signal measurement device 13 has the function of obtaining the common mode rejection ratio (CMRR) of the signal light side from the intensity ratio of the intensity $I_\omega$ of the electrical signal corresponding to the frequency $\omega$ [Hz] outputted as the differential component of the first optical two-tone signal which is the signal light and the second optical two-tone signal which is the locally generated light, to the intensity $I_{\omega-\Delta\omega}$ of the electrical signal corresponding to the frequency ($\omega-\Delta\omega$ [Hz]) of only the first optical two-tone signal which is the signal light.

And it is further desirable for the electrical signal measurement device 13 to have the function of obtaining the common mode rejection ratio (CMRR) of the locally generated light side from the intensity ratio of the intensity $I_\omega$ of the electrical signal corresponding to the frequency $\omega$ [Hz] outputted as the differential component of the first optical two-tone signal which is the signal light and the second optical two-tone signal which is the locally generated light, to the intensity $I_{\omega+\Delta\omega}$ of the electrical signal corresponding to the frequency difference ($\omega+\Delta\omega$ [Hz]) of only the second optical two-tone signal which is the locally generated light.

The device described above can, for example, be employed as an in-phase signal rejection ratio measurement device for the I signal component of a single polarization (for example X polarization).

In the following, a method according to the present invention for obtaining the common mode rejection ratio will be explained.

The branch part 5 branches the laser light of the measurement frequency $\omega$ [Hz] generated from the laser light source 3, and thereby obtains first branched light and second branched light. At this time, it is desirable for the first branched light and the second branched light to be light beams produced by intensity separation of the laser light (in particular light beams separated at the same intensity).

The first optical two-tone generator 7 receives the first branched light branched by the branch part 5, and generates a first optical two-tone signal, which is the signal light (Sig). This first optical two-tone signal has a frequency difference ($\omega-\Delta\omega$ [Hz]) which is lower than the measurement frequency.

And the second optical two-tone generator 9 receives the second branched light branched by the branch part 5, and generates a first second optical two-tone signal, which is the locally generated light (LO). This second optical two-tone signal has a frequency difference ($\omega+\Delta\omega$ [Hz]) which is higher than the measurement frequency. A device for generating an optical two-tone signal is per se known, as for example described in Japanese Laid-Open Patent Publication 2012-37493. In this method, high frequency signals ($f_1$ and $f_2$) are applied to two sub-MZMs, the bias voltage of the main MZM is adjusted, and the phase difference between the DSB-SC modulation signals outputted from the two sub-MZMs (Mach-Zender modulators) is brought to be equal to $\pi/2$. And square-law detection is performed with a high speed photodetector. When this is done, it is possible to obtain an optical two-tone signal that consists of the double frequency components ($2f_1$ and $2f_2$) of the high frequency signal in which the cross-term components ($f_1-f_2$ and $f_1+f_2$) have been suppressed. DSB-SC (double sideband suppressed carrier wave) modulation is per se known, and a DSB-SC signal can be used as an optical two-tone signal.

Figure 2:
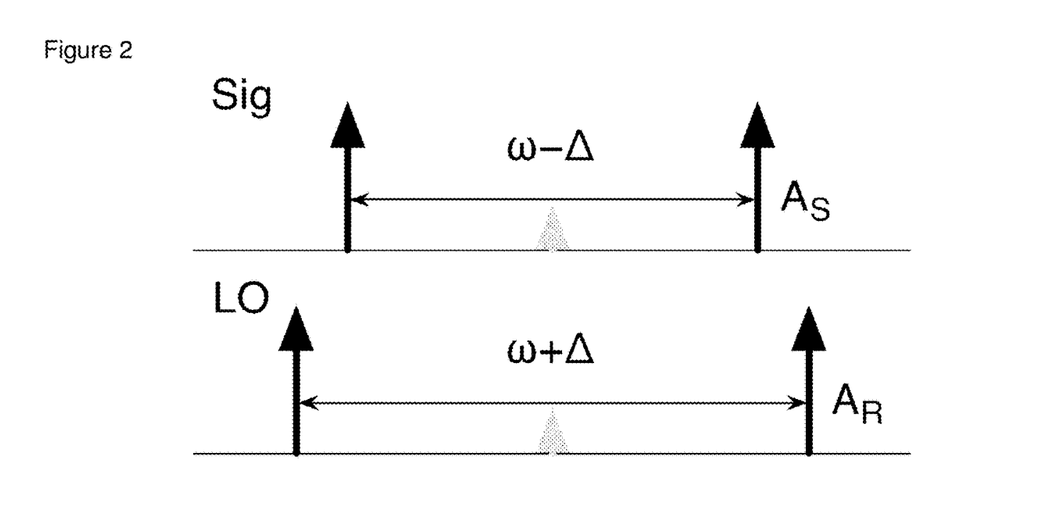
FIG. 2 is a figure in which a first optical two-tone signal (Sig) and a second optical two-tone signal (LO) are conceptually shown.

FIG. 2 is a figure in which the first optical two-tone signal (Sig) and the second optical two-tone signal (LO) are conceptually shown. It should be understood that, in FIG. 2, $\Delta\omega$ is simply shown as $\Delta$. The signal that is present in the central frequency region between the first optical two-tone signal (Sig) and the second optical two-tone signal (LO) is the carrier wave component ($\omega$ [Hz]).

Figure 3:
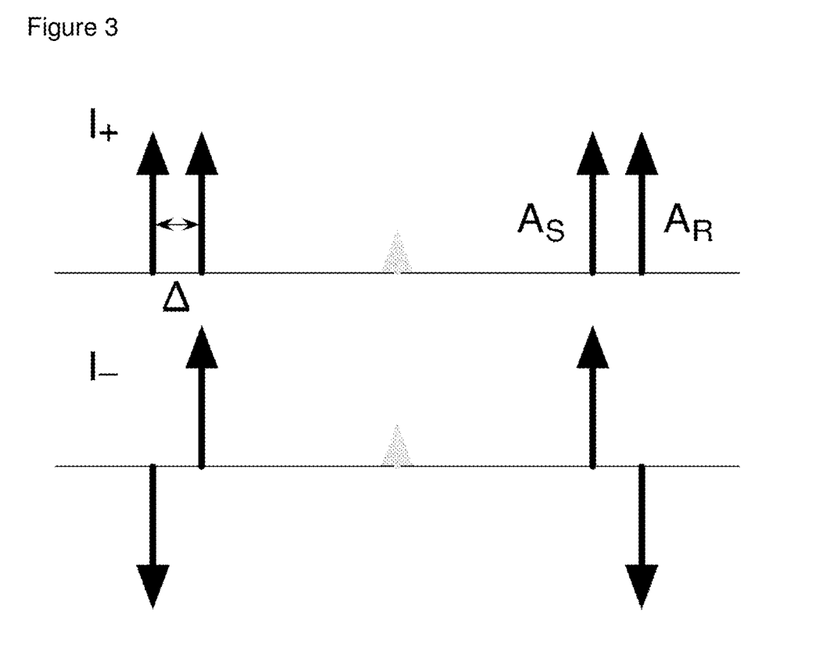
FIG. 3 is a conceptual figure showing two-tone light on the I channel side.

FIG. 3 is a conceptual figure showing the two-tone light on the I channel side. The coherent optical receiver 11 receives the first optical two-tone signal (Sig) and the second optical two-tone signal (LO), and mixes these input beams with the 90° hybrid. The $I_+$ signal indicates an-phase combination of the first optical two-tone signal (Sig) and the second optical two-tone signal (LO). And $A_S$ and $A_R$ in this figure denote the optical signals $A_S$ and $A_R$ in FIG. 2. Moreover, the $I_-$ signal indicates that the first optical two-tone signal (Sig) and the second optical two-tone signal (LO) have been combined in opposite phase. The phase of the remaining branched local light is converted by 90°, and it is then conducted together with the remaining branched signal light, resulting in two-tone light on the Q channel side.

Figure 4:
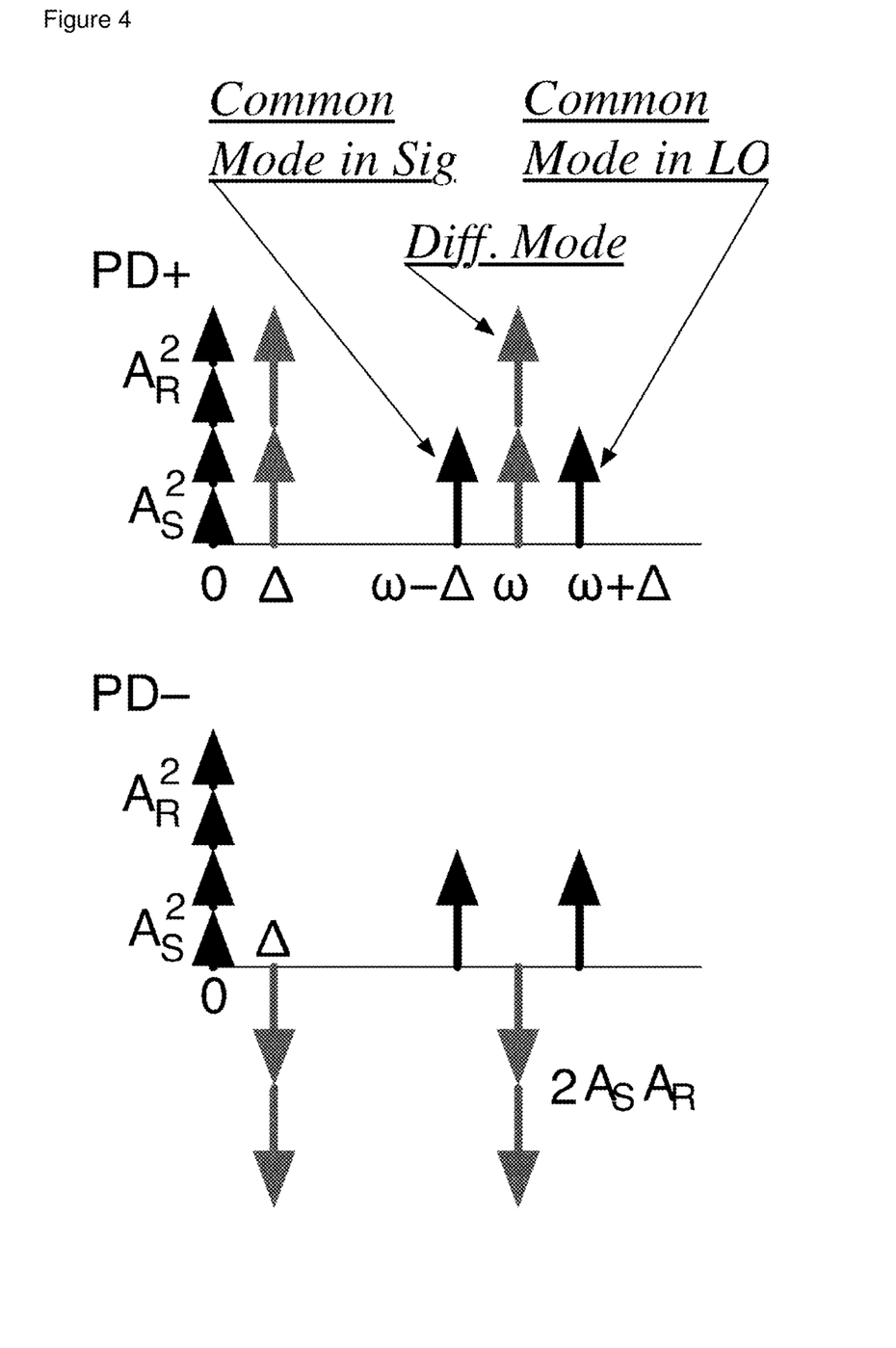
FIG. 4 is a conceptual figure showing the spectrum of an electrical signal outputted from a balanced PD in a coherent optical receiver.

FIG. 4 is a conceptual figure showing the spectrum of the electrical signal outputted from the balanced PD in the coherent optical receiver. As shown in FIG. 4, the two-tone light is inputted to each of the balanced PDs, and square-law detection is performed. And then the signal side in-phase signal (Common Mode in Sig) is outputted to $\omega-\Delta\omega$, the local light side in phase signal (Common Mode in LO) is outputted to $\omega+\Delta\omega$, and the differential signal (Diff. Mode) is outputted to $\omega$.

Figure 5:
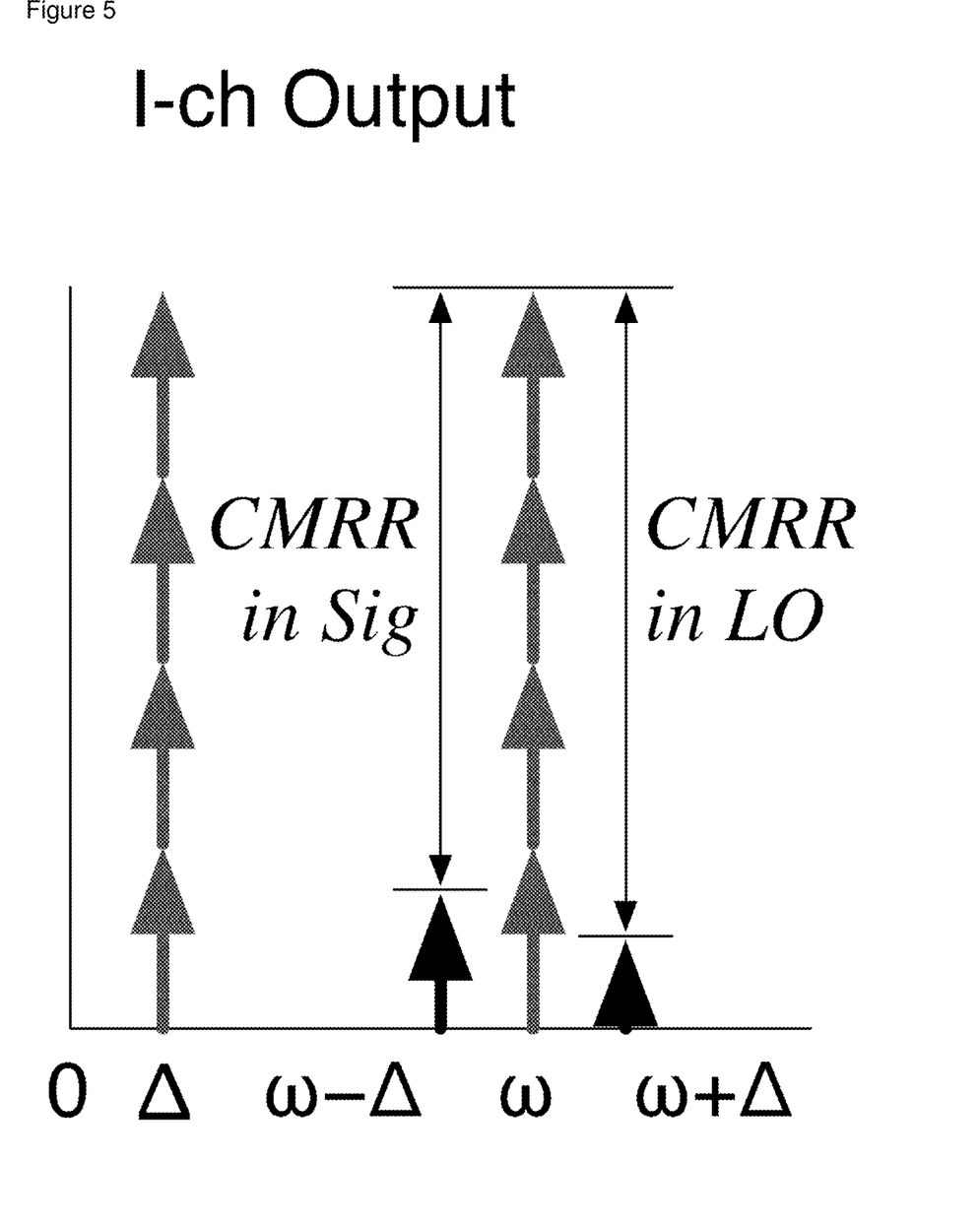
FIG. 5 shows the I channel output spectrum based upon an electrical signal outputted from the balanced PD.

FIG. 5 shows the I channel output spectrum based upon the electrical signal outputted from the balanced PD. As shown in FIG. 5, by taking the differential of the PD in-phase signal and the PD opposite phase signal, the opposite phase component is added and the in-phase component is subtracted, thus resulting in the spectrum shown in FIG. 5. However perfect cancellation is not possible since there are naturally some unbalances in the amplitude and phase of the in-phase component, and there will be some residual. Due to this, by observing the output electrical signal with a spectrum analyzer or the like, it becomes possible to measure the intensity ratio of the intensity of the signal having the frequency of $\omega-\Delta\omega$ with respect to the intensity of the signal having the frequency $\omega$, as being the CMRR on the signal light side. Furthermore, it becomes possible to measure the intensity ratio of the intensity of the signal having the frequency of $\omega+\Delta\omega$ with respect to the intensity of the signal having the frequency $\omega$, as being the CMRR on the local light side.

In other words, it is possible to obtain the common mode rejection ratio (CMRR) on the signal light side from the intensity ratio of the intensity $I_\omega$ of the electrical signal corresponding to the frequency $\omega$ [Hz] outputted as the differential component of the first optical two-tone signal which is the signal light and the second optical two-tone signal which is the locally generated light, and the intensity $I_{\omega-\Delta\omega}$ of the electrical signal corresponding to the frequency ($\omega-\Delta\omega$ [Hz]) of only the first optical two-tone signal which is the signal light.

Moreover, it is possible to obtain the common mode rejection ratio (CMRR) on the locally generated light side from the intensity ratio of the intensity $I_\omega$ of the electrical signal corresponding to the frequency $\omega$ [Hz] outputted as the differential component of the first optical two-tone signal which is the signal light and the second optical two-tone signal which is the locally generated light, and the intensity $I_{\omega+\Delta\omega}$ of the electrical signal corresponding to the frequency ($\omega+\Delta\omega$ [Hz]) of only the second optical two-tone signal which is the locally generated light.

The frequency characteristics of a coherent optical receiver can be obtained by repeatedly changing the measurement frequency, and obtaining the frequency characteristics of the common mode rejection ratio (CMRR) corresponding to the changed frequency range. The frequency characteristic of a coherent optical receiver means the characteristic of the coherent optical receiver when the subject frequency changes, i.e. how the common mode rejection ratio (CMRR) varies.

It should be understood that the present invention can be applied, not only to a device and a method for measuring the in-phase signal rejection ratio for a single polarized (for example, X polarized) I signal component, but also to a more complicated embodiment. For example, it would be possible to obtain the common mode rejection ratio (CMRR) on the signal light side or the common mode rejection ratio (CMRR) on the locally generated light side by treating the I signal component and the Q signal component whose phase is 90° different on the time axis from this I signal component as an optical two-tone signal.

A Specific Embodiment

Figure 6:
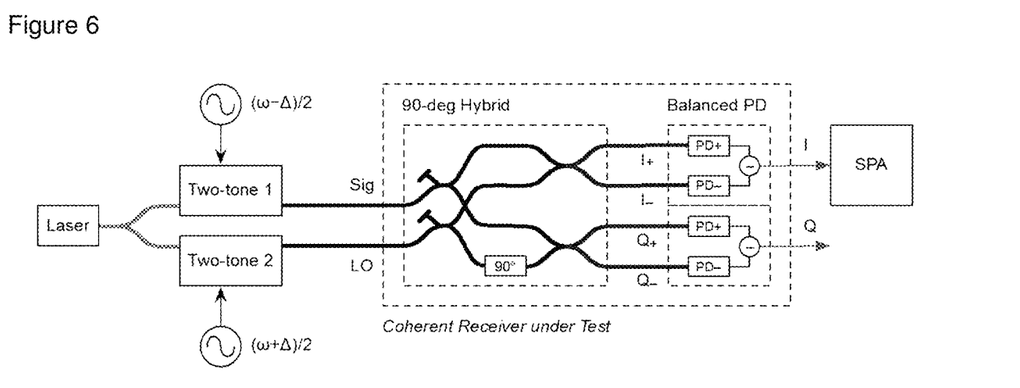
FIG. 6 is a conceptual figure showing the structure of an experimental system in a concrete embodiment.

FIG. 6 shows the structure of an experimental system in a specific embodiment. This construction includes a laser light source, an optical two-tone signal generator (two-tone 1, two-tone 2), two signal modulation sources (($\omega-\Delta$)/2) and (($\omega+\Delta$)/2), a 90° optical hybrid, a balanced PD, a coherent optical receiver (which is the coherent receiver under test), and a spectrum analyzer (SPA). The coherent optical receiver is constructed by connecting the 90° optical hybrid and the balanced PD together via a variable optical attenuator and a variable optical delay line, and measures the signal light side CMRR versus frequency characteristic and the locally generated light side CMRR versus frequency characteristic for every 2 GHz up to 40 GHz.

Figure 7:
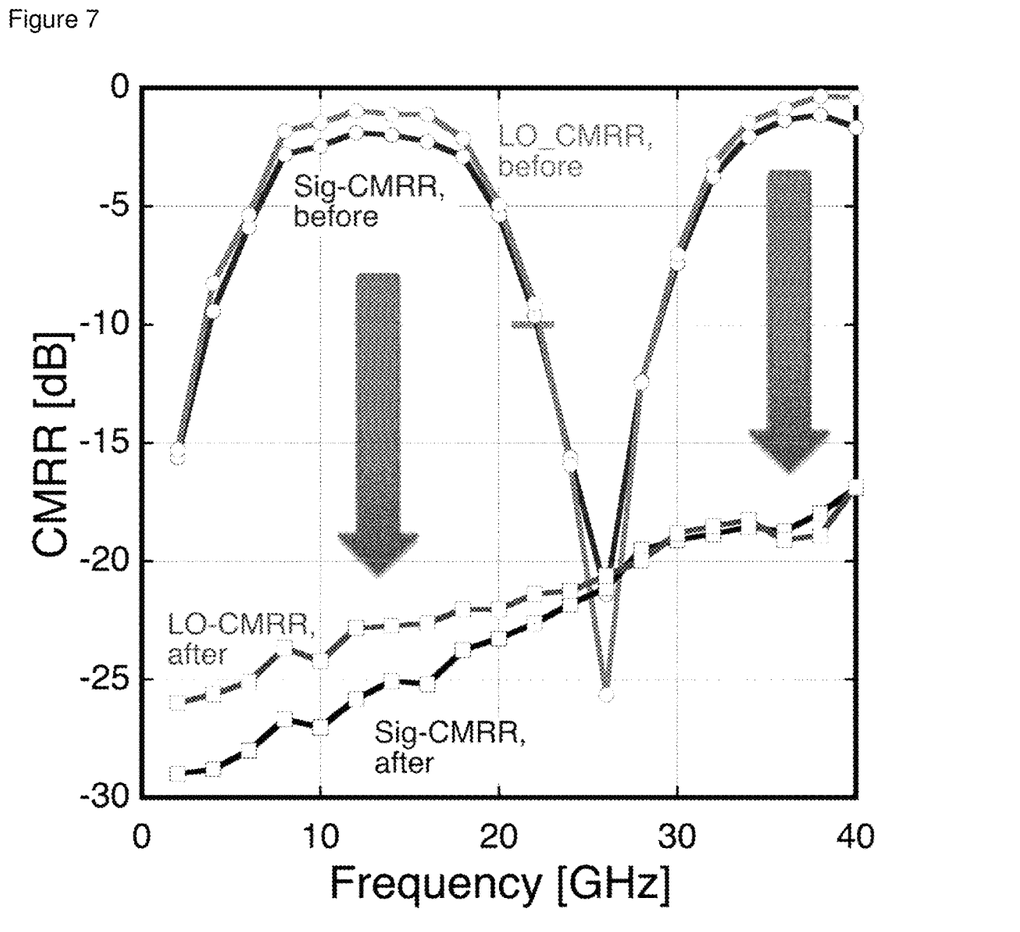
FIG. 7 is a change graph showing the results of measurement of signal light side CMRR and locally generated light side CMRR before and after adjustment of a variable delay line.

FIG. 7 is a change graph showing the results of measurement of the signal light side CMRR and the locally generated light side CMRR before and after adjustment of the variable delay line. The CMRR (in decibels) is shown along the vertical axis and the frequency [in GHz] is shown along the horizontal axis. First, the variable optical attenuator is adjusted so that the CMRR at 2 GHz becomes maximum, with the signal light side CMRR and the local light side CMRR for which the frequency characteristics are measured being respectively shown as "Sig-CMRR before" and "LO-CMRR before". It will be understood that periodically the CMRRs deteriorate greatly, due to the optical path length difference. Next, the signal light side CMRR and the local light side CMRR for which the frequency characteristics were measured after adjustment of the variable delay lines as well are respectively shown as "Sig-CMRR after" and "LO-CMRR after". From this figure it will be understood that, as a result of quantifying the amount of delay of the variable delay line, the periodic deterioration disappeared, and satisfactory CMRRs of greater than or equal to 15 dB were obtained even at 40 GHz.

INDUSTRIAL APPLICABILITY

The present invention can be utilized in the field of optical communication.

REFERENCE SIGNS LIST

1: common mode rejection ratio measurement device
3: laser light source
5: branch part
7: first optical two-tone generator
9: second optical two-tone generator
11: coherent optical receiver
13: electrical signal measurement device

The invention claimed is:

1. A common mode rejection ratio measurement device (1) for a coherent optical receiver at a measurement frequency ($\omega$ [Hz]), comprising:
    a branch part (5) that branches light having the measurement frequency ($\omega$ [Hz]) from a laser light source (3) to obtain a first branched light and a second branched light;
    a first optical two-tone generator (7) that receives the first branched light branched by the branch part (5), and generates a first optical two-tone signal which is a signal light;
    a second optical two-tone generator (9) that receives the second branched light branched by the branch part (5), and generates a second optical two-tone signal which is locally generated light; and
    an electrical signal measurement device (13) that measures and analyzes an output electrical signal outputted from a coherent optical receiver (11) that is a subject for measurement of common mode rejection ratio (CMRR); wherein:
    the first optical two-tone signal has a frequency difference ($\omega-\Delta\omega$ [Hz]) that is lower than the measurement frequency;
    the second optical two-tone signal has a frequency difference ($\omega+\Delta\omega$ [Hz]) that is higher than the measurement frequency; and
    the electrical signal measurement device (13) has a function of obtaining the common mode rejection ratio (CMRR) on the signal light side from an intensity ratio of an intensity $I_\omega$ of an electrical signal corresponding to a frequency $\omega$ [Hz] outputted as a differential component of the first optical two-tone signal which is the signal light and the second optical two-tone signal which is a locally generated light, and an intensity $I_{\omega-\Delta\omega}$ of an electrical signal corresponding to a frequency ($\omega-\Delta\omega$ [Hz]) of only the first optical two-tone signal which is the signal light;
    wherein the method further includes a step of repeatedly changing the measurement frequency, and obtaining a frequency characteristic of the common mode rejection ratio (CMRR) corresponding to frequency range of change.

2. A common mode rejection ratio measurement device for a coherent optical receiver according to claim 1,
    wherein the electrical signal measurement device (13) further comprises a function of obtaining the common mode rejection ratio (CMRR) on the locally generated light side from the intensity ratio of the intensity $I_\omega$ of the electrical signal corresponding to the frequency $\omega$ [Hz] outputted as the differential component of the first optical two-tone signal which is the signal light and the second optical two-tone signal which is locally generated light, and the intensity $I_{\omega+\Delta\omega}$ of an electrical signal corresponding to the frequency difference ($\omega+\Delta\omega$ [Hz]) of only the second optical two-tone signal which is the locally generated light.

3. A method for obtaining common mode rejection ratio for a coherent optical receiver, including:
    a step of branching light having the measurement frequency ($\omega$ [Hz]) from a laser light source (3), and obtaining a first branched light and a second branched light;
    a step of receiving the first branched light and generating a first optical two-tone signal which is signal light, this first optical two-tone signal having a frequency difference ($\omega-\Delta\omega$ [Hz]) that is lower than the measurement frequency;

a step of receiving the second branched light and generating a second optical two-tone signal which is locally generated light, this second optical two-tone signal having a frequency difference ($\omega+\Delta\omega$ [Hz]) that is higher than the measurement frequency; and a step of measuring and analyzing a output electrical signal outputted from a coherent optical receiver (11) that is a subject of measurement of common mode rejection ratio (CMRR), and obtaining the common mode rejection ratio (CMRR) on the signal light side from an intensity ratio of an intensity $I_\omega$ of an electrical signal corresponding to a frequency $\omega$ [Hz] outputted as a differential component of the first optical two-tone signal which is the signal light and the second optical two-tone signal which is locally generated light, and an intensity $I_{\omega-\Delta\omega}$ of an electrical signal corresponding to a frequency ($\omega-\Delta\omega$ [Hz]) of only the first optical two-tone signal which is the signal light;

wherein the method further includes a step of repeatedly changing the measurement frequency, and obtaining a frequency characteristic of the common mode rejection ratio (CMRR) corresponding to frequency range of change.

4. A method for obtaining common mode rejection ratio for a coherent optical receiver according to claim 3, further including:

a step of measuring and analyzing the output electrical signal; and a step of obtaining the common mode rejection ratio (CMRR) on the locally generated light side from an intensity ratio of an intensity $I_\omega$ of an electrical signal corresponding to an frequency $\omega$ [Hz] outputted as a differential component of the first optical two-tone signal which is the signal light and the second optical two-tone signal which is locally generated light, and an intensity $I_{\omega+\Delta\omega}$ of an electrical signal corresponding to a frequency ($\omega+\Delta\omega$ [Hz]) of only the second optical two-tone signal which is the locally generated light.

\* \* \* \* \*